United States Patent [19]

Daubignard

[11] 4,345,824

[45] Aug. 24, 1982

[54] EYEGLASS FRAMES OPENABLE AT THE BRIDGE

[75] Inventor: Jean-Michel Daubignard, Villiers-sur-Marne, France

[73] Assignee: Essilor International "Cie Generale d'Optique", Creteil, France

[21] Appl. No.: 162,636

[22] Filed: Jun. 24, 1980

[30] Foreign Application Priority Data

Jun. 27, 1979 [FR] France ................ 79 16524

[51] Int. Cl.³ ............... G02C 1/00; G02C 1/08; G02C 5/12
[52] U.S. Cl. ........................ 351/98; 351/88; 351/138
[58] Field of Search ............. 351/88, 133, 138, 149, 351/98

[56] References Cited

U.S. PATENT DOCUMENTS

| 3,391,976 | 7/1968 | Lindbloom | 351/88 |
| 3,801,189 | 4/1982 | Bolle . | |
| 4,252,422 | 2/1981 | Speckhart | 351/88 |

FOREIGN PATENT DOCUMENTS

| 2044209 | 2/1971 | France . |
| 2125805 | 9/1972 | France . |
| 2147478 | 3/1973 | France . |

*Primary Examiner*—John K. Corbin
*Assistant Examiner*—Rodney Bovernick
*Attorney, Agent, or Firm*—Charles E. Brown

[57] ABSTRACT

An eyeglass frame in which the rims are openable at their inner (nose) sides. A slot is defined between a pair of pins extending between the rims. A latching member is pivotally mounted on one of the pin and hooks onto the other pin in its closed position for closing the rims and clamping the associated lens therein. An overlay member may be provided on the visible side of the latching member.

7 Claims, 9 Drawing Figures

EYEGLASS FRAMES OPENABLE AT THE BRIDGE

FIELD OF THE INVENTION

The present invention relates generally to eyeglass or spectacle frames, and more particularly to metal fronts of eyeglass frames.

BACKGROUND OF THE INVENTION

As is known an eyeglass frame front generally comprises two rims each adapted to receive an ophthalmic lens or more generally an eyeglass lens and joined to the other at the inner (nose) sides by a nose bridge, at each outer (temple) side the rims are provided with pivot yokes for pivotally mounting sidepieces known as temples.

In the case of metal eyeglass frames it is practically compulsory that each of the rims have a slot to permit the mounting of the lens therein. Most often the slots are disposed at the outer (temple) sides of the rims.

It has, however, been proposed, in French Pat. publication No. 2,044,209 to provide the slot at the inner sides of the rims, the nose bridge joining the rims being virtually divided into two substantially parallel pins which extend to either side of the slots of the rims, closure means being associated with the slots for closing the rims around the eyeglass lenses once in position.

This arrangement has the advantage of simplified positioning of the eyeglass lenses, a single operation being sufficient to close both rims enclosing the lenses, and therefore facilitating, if desired, changing of lenses, for example, depending on lighting conditions. It has another advantage of facilitating the adoption of a yoke of any desired configuration on which the temple is pivoted, such a yoke being free of constraints due to its bordering on the slot and the corresponding closure means therefor, or having to be combined with the slot of the closure means.

Yet, in practice, in the embodiment disclosed in the French patent publication No. 2,044,209 mentioned above, in which the eyeglass frame front is made of synthetic material with a central nose bridge split into two pins adapted to be in contact with each other for closing the corresponding rims, the latching means provided for transversely securing the two pins to each other being formed by a separate part, e.g., a screw or clip, to be mounted on the eyeglass front.

The handling of such a separate part, by its very nature, makes the closing of the rims awkward to the detriment of the sought-after simplicity, notably when the rims are closed at the place where they are being worn.

Further, the inadvertent dropping of the part in question in the course of the closing operation, which is always possible, may cause the previously positioned lenses themselves to fall out, which is likely to damage the lenses.

SUMMARY OF THE INVENTION

An object of the invention is to provide an arrangement which totally or substantially eliminates such drawbacks.

According to the invention there is provided a front for eyeglass frames including two rims adapted to receive lenses and having an open end adjacent the inner side forming a slot, the rims being connected to each other on each side of the slot by two substantially parallel pins. The frame front is characterized by a first of the pins defining a pivot pin, a latching member permanently pivotally mounted thereon, and releasable latching means being provided between the second of the pins and the latching member.

Owing to this arrangement which is characterized by the separation of the functions of the two pins which prevents their coming into contact with each other in the course of use, the means for locking the rims in their closed position provided on the front of the frame, are permanently mounted on the front.

The operation of closing the rims on the front is facilitated, and a slip in the course of this operation is not of a nature to cause the part constituting the latching means to be dropped inadvertently.

According to a preferred feature of the invention the rear side of the latching member which defines the latching means carries detent means adapted to permit removably mounting a separate part, i.e. an overlay member provided with comperable detent means. But such an overlay member is itself of sufficient size, particularly when according to a supplementary feature of the invention, it carries nosepieces in one piece therewith, and in any event greater than that of a mere screw or clip so that its being inadvertently dropped in the course of closing the rims is unlikely.

It is all the less likely since this operation occurs after the lenses are in position clamped in place. Moreover, dropping this part, should it ever occur, is not capable of interfering with the effective closing of the rims of the eyeglass frames which has already been effected, and therefore the dropping of the lenses which are already clamped into place.

These and other features and advantages of the invention will be brought out in the description which follows, given by way of example, with reference to the accompanying diagrammatic drawings.

DETAILED DESCRIPTION OF PREFERRED EMBODIMENT

The drawings illustrate the application of the invention to eyeglass frame of metal, the invention being especially intended for such frame.

Typically such eyeglass frames essentially comprise a front part 10, two temples or sidepieces 11 laterally pivotally mounted thereon.

Figure 1:
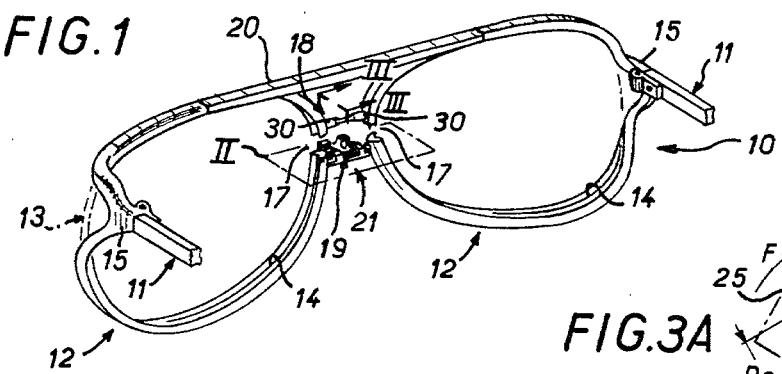
FIG. 1 is a fragmentary perspective rear view of an eyeglass frame embodying a front according to the invention.
Figure 5:
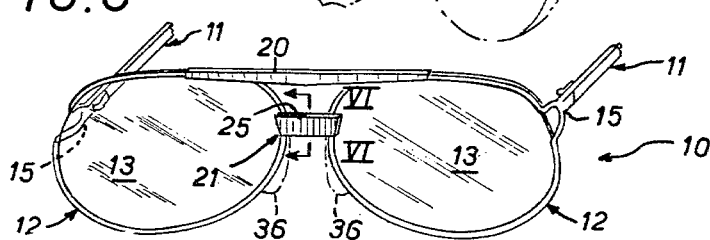
FIG. 5 is a fragmentary perspective view, from the front, of the eyeglass frame having a front part embodying the invention, with the lenses mounted therein.

The front part 10 itself usually comprises two rims 12 which are each adapted to receive a lens 13 such as schematically represented in phantom lines in FIG. 1 and shown in FIG. 5. The front also has at each outer (temple) side a laterally extending yoke 15 for the pivotal mounting of the corresponding temple 11.

For their required opening for mounting a lens 13, each of the rims 12 has a slot 17 facing each other at the inner (nose) side of the front part of the frame. Further, the rims 12 are connected to each other on each side of their slots 17 by two substantially parallel pins, an upper pin 18 and a lower pin 19.

In the illustrated embodiment the rims 12 are also connected at their top sides to each other by a main bar 20.

According to the invention a first of the pins 18, 19, which is pin 19 in the illustrated embodiment, defines a pivot pin on which a latching member 21 is permanently pivotally mounted; and between the latching member 21 and the second of the pins which is therefore the upper pin 18 in the illustrated embodiment, releasable latching means are provided.

In the illustrated embodiment the lower pin 19 which is suitably fixed, for example, by soldering, to the rims 12 it interconnects, has in the vicinity of its ends to each side of a central portions 23 of lesser section, two portions 24 of larger section on which the latching member 21 is pivotally engaged.

In the embodiment illustrated in FIGS. 1-6, the latching member 21 comprises a solid one-piece part having a plate 25 of generally trapezoidal contour, FIG. 5, from the rear side of which protrude two bearings 26 in pivotal engagement with the larger diameter portions 24 of the lower pin 19.

In the illustrated embodiment the releasable latching or fastening means provided between the latching member 21 and the upper pin 18 comprise at least one latching projection 27 on the latching member adapted to hook onto the upper pin 18.

In practice two latching projections 27 are provided spaced from each other on the latching member 21, parallel to the pins 18, 19, each of the latching projections 27 being of hook configuration and in line with one of the bearings 26.

In line with each latching projection 27 on the latching member 21 for cooperation therewith the upper pin 18 has a section which is at least in part circular.

In the illustrated embodiment the upper pin 18 is circular in section along its entire length, the upper pin 18 comprising as does the lower pin 19, in the vicinity of its ends, two portions 30 of greater diameter surrounding a central portion 31 of lesser diameter, and suitably fixed, for example by soldering, to the rims 12 it interconnects.

Each latching projection 27 on the latching member 21 therefore has a circular inner contour for clamping the larger diameter portion 30 of the upper pin 18 over more than 180°. For its engagement on the larger diameter portion 30 of the upper pin 18, each latching projection 27 on the latching member 21 may be advantageously made at least in part of elastically deformable material.

In the embodiment illustrated in the drawings, the latching member 21 is associated with an overlay member 32 on the rear face of the latching member.

For this purpose there are provided on the middle of the rear face of the latching member 21 detent means adapted to removably mount the overlay member 32, the overlay member being provided with complementary detent means for this purpose.

As illustrated in the drawings such detent means comprise in the illustrated embodiment a press button or snap type mounting, including a male portion 33 on the latching member 21 and a complementary recess 34 on the overlay member 32.

As diagrammatically illustrated in phantom lines in the drawings, the overlay member 32 may carry in one piece a nosepiece 36 forming therewith a nose saddle.

Figure 3A:
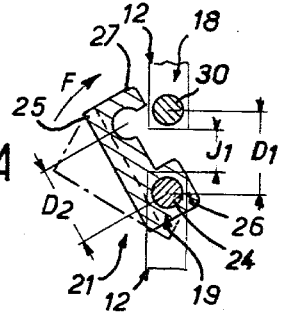
FIG. 3A is a fragmentary cross-section on a different scale of the front part of the eyeglass frame illustrated in FIG. 1, taken on line III—III in FIG. 1, in the open position of the rims of the front part of the frame.
Figure 2:
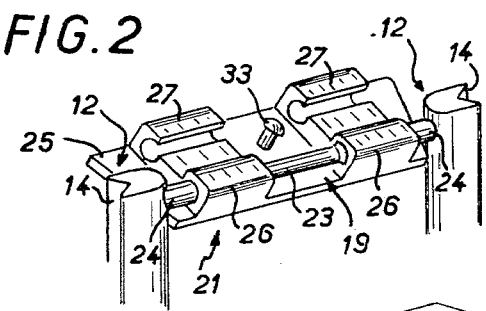
FIG. 2 repeats on an enlarged scale the portion in the inset I in FIG. 1.
Figure 3B:
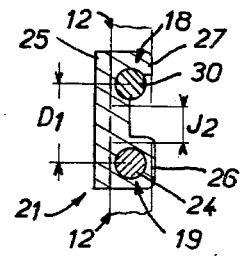
FIG. 3B is a view similar to that of FIG. 3A for the closed position of the rims.
Figure 4:
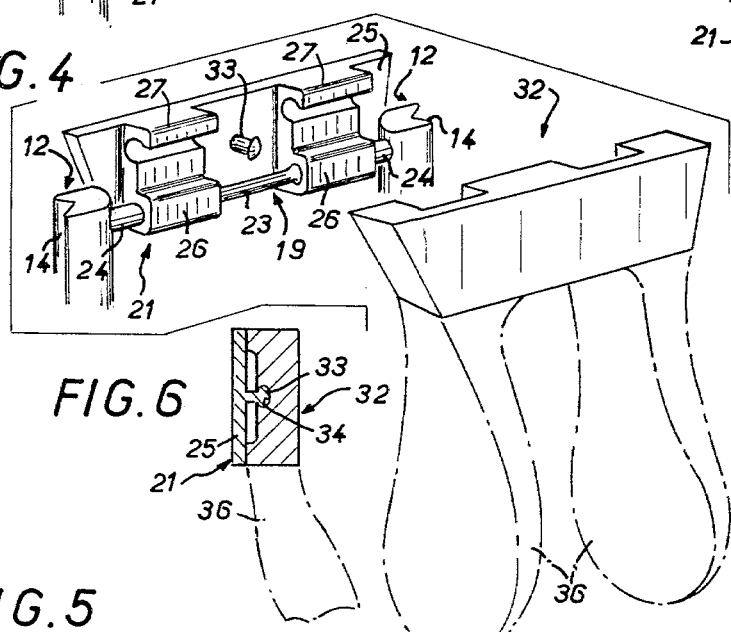
FIG. 4 is a view similar to that of FIG. 2 for the closed position.

The lenses 13 are positioned in the rims 12 while the latching member 21 is flipped to its open position, FIGS. 1, 2 and 3A. In the open position the geometrical axes of the pins 18 and 19 are at a distance $D_1$ from each other greater than distance $D_2$ between the center of bearings 26 of the latching member 21 to the axis of the inner contour of the latching projections 27 on the latching member 21, see FIG. 3A.

The ends of a rim 12 defining the slot 17 are then at a distance $J_1$ from each other.

As diagrammatically represented by an arrow F in FIG. 3A the latching member 21 is then flipped to its closed position by rotation about the lower pin 19 which defines the pivot pin for the latching member. At the end of this pivotal movement, taking into consideration the inherent elasticity of the rims 12 and the inherent elasticity of its latching projection 27, the latching member 21 is elastically hooked or latched to the upper pin 18 by the latching projections 27, FIG. 3B.

The ends of the rim 12 defining the slot 17 are then at a distance $J_2$ from each other, less than the previous distance $J_1$. Each lens 13 is thus firmly clamped by its associated rim 12. Then it is simply necessary to snap the overlay member 2 onto the latching member 21, FIGS. 4-6.

The removal of lens 13 is carried out by reversing the steps, by first removing the overlay member 32 then flipping the latching member 21 into its open position.

In the foregoing description the bearings 26 on the latching member 21 are of closed contour, their bores have continuous or closed circular sections in engagement with the lower pin 19. Consequently the latching member 21 must be put into place on the lower pin 19 before the latter is fixed to the rims 12.

Figure 7:
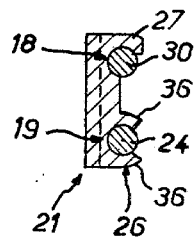
FIGS. 7 and 8 are views similar to that of FIG. 3B for respective modified embodiments.
Figure 6:
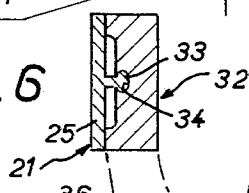
FIG. 6 is an enlarged cross-sectional view of the frame taken on line VI—VI in FIG. 5.
Figure 8:
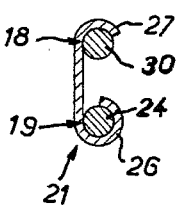

In the modified embodiment of FIGS. 7 and 8, the latching member 21 may be positioned on the lower pin 19 after lower pin 19 has been secured to the rims 12 it interconnects.

For example in FIG. 7, each bearing 26 on the latch flap 21 may comprise two tabs 36 crimped partially around the lower pin 19 after being brought into engagement therewith. In this case the latching member 21 may remain a generally solid part.

In the modified embodiment of FIG. 8, the latching member may be formed as a plate like member curled at each end to form a bearing 26 and to define a latching projection 27 in the shape of a hook.

Of course the present invention is not limited to the described and illustrated embodiments, but may encompass various alternatives, modifications and expedients without departing from the spirit and scope of the invention as defined by the appended claims.

Specifically the trapezoidal contour of the latching member 21 is optional, the latching member may be pivotally mounted on the upper pin rather than the lower pin on the front of the eyeglass frame and the latching projection or projections it comprises for releasable engagement with the second pin is or are not necessarily in the shape of a hook.

Moreover, the pin may be provided with a latching projection for cooperation with a complementary recess defined on the latching member.

Finally, the nosepieces 36, which the optional overlay member may carry, may, if desired, laterally clip onto the corresponding rims bearing in mind that conventionally such nosepieces are secured permanently to their associated rims.

What is claimed is:

1. In an eyeglass frame a frame front comprising two rims adapted to receive lenses, a pair of substantially parallel pins interconnecting said rims, each of said rims having an inner open end facing each other and defining a slot between said pins, a first of said pins forming a pivot pin permanently pivotally mounting a latching member and releasable latching means operatively arranged between said latching member and a second of said pins.

2. A frame front according to claim 1, wherein said releasable latching means comprise a latching projection on said latching member adapted to latch or hook said second pin.

3. A frame front according to claim 2, wherein said second pin has a contour which is at least partly circular opposite said latching projection on said latching member.

4. A frame front according to claim 3, wherein said latching projection on said latching member is hook shaped.

5. A frame front according to claim 2, wherein two said latching projections are provided on said latching member spaced from each other parallel to said pins interconnecting said rims.

6. A frame front according to claim 1, wherein detent means are provided on a rear face of said latching member adapted to removably secure an overlay member provided with complementary detent means.

7. A frame front of an eyeglass frame according to claim 6, wherein said overlay member is formed in one piece with nosepieces of said frame.

* * * * *